United States Patent Office 3,845,094
Patented Oct. 29, 1974

3,845,094
PROCESS FOR VAPOR PHASE AMMOXIDATION
Howard P. Angstadt, 490 S. Middletown Road,
Media, Pa. 19063
No Drawing. Filed Nov. 28, 1972, Ser. No. 310,051
Int. Cl. C07c 121/02
U.S. Cl. 260—465 C         14 Claims

ABSTRACT OF THE DISCLOSURE

In the vapor phase process of ammoxidation of organic compounds to form nitriles from ammonia and an organic reactant in the absence of added oxygen, the improvement which comprises using as catalyst-reactant a composition comprising a vanadium oxide intermediate between $V_2O_5$ and $V_2O_3$ and with the proviso that said oxide is devoid of $V_2O_5$, said catalyst being removed from said process and regenerated to the intermediate oxide prior to its *in-situ* conversion to significant amounts of $V_2O_3$, whereby the conversion to nitriles is achieved without significant decomposition of said organic reactants and products to carbon oxides.

---

The vapor phase ammoxidation of organic compounds to nitriles is well known and is exemplified by U.S. 2,450,639 (Denton, assigned to Socony-Vacuum Oil Co., issued Oct. 5, 1948), U.S. 2,463,457 (Denton, assigned to Socony-Vacuum Oil Co., issued March 1, 1949), by U.S. 2,496,661 (Denton, assigned to Socony-Vacuum Oil Co., issued Feb. 7, 1950), and by U.S. 3,479,385 (Huibers, assigned to The Lummus Company, issued Nov. 18, 1969). This process is particularly useful for preparing nitriles of aromatic hydrocarbons, as for example, conversion of toluene to benzonitrile, xylenes to toluonitriles and phthalonitriles, and the like, and is also of value generally for converting alkyl-substituted aliphatic, aromatic, alicyclic, and heterocyclic compounds to the corresponding nitriles.

In carrying out the process, a catalyst is used and a preferred catalyst may be an oxide, salt, or acid of vanadium, molybdenum, tungsten, titanium or their mixture. In starting up the process, the art teaches that the catalyst may be conditioned in order to have initial maximum catalytic efficiency and this is done by exposing it to ammonia, hydrogen, or both for a period of time, usually several minutes to several hours. Then, the process is started by passing the reactant stream composed of organic reactant, ammonia, and oxygen over the catalyst under reaction conditions. In some ammoxidation processes such as that disclosed in U.S. 3,479,385 and U.S. 2,450,639, oxygen is omitted from the reactant stream, but is provided *in-situ* by the high oxidation state oxide catalyst. Regeneration of spent catalysts by oxidation to a higher valence state is also disclosed in the art as, for example, in U.S. 3,479,385, 2,450,639 and the other above-mentioned patents.

A serious problem that has heretofore confronted attempts to commercialize ammoxidation processes such as described above is the high conversion of reactants and products to carbon oxides. It is frequently found that although such processes give good conversion of hydrocarbon, a large proportion of hydrocarbon reactant or nitrile product is oxidized to carbon dioxide and carbon monoxide. This problem has, to a large extent, been the cause for failure of such ammoxidation processes to reach commercial success.

It has now been found, however, that in the vapor phase ammoxidation of alkyl-substituted organic compounds in the absence of added oxygen, a high conversion and selectivity to nitrile product can be maintained and the formation of carbon oxides minimized very significantly. This is accomplished in accord with this invention, by using as catalyst-reactant a composition comprised of a vanadium oxide where said oxide consists of an oxide of vanadium between $V_2O_5$ and $V_2O_3$, and with the proviso that the catalyst is essentially devoid of $V_2O_5$ and said catalyst is removed from said process and is regenerated to the intermediate oxide prior to its *in-situ* conversion to significant amounts of $V_2O_3$.

In carrying out the process of the invention, the reactor and attendant equipment is prepared in the usual way, the reactor being charged with the catalyst composition and otherwise prepared for start-up. Fixed-bed, moving-bed and fluidized-bed reactors are all suitable for the process of the invention. The hydrocarbon to be reacted and ammonia are then passed over the catalyst-reactant in the reactor at about 300° to about 600° C. at pressures ranging from atmospheric to about 100 p.s.i.g. Preferred treatment conditions will be about 350° C. to about 475° C. at essentially atmospheric pressure. Although not necessary, the reactants may be diluted with an inert gas such as helium, nitrogen, etc. The concentration of organic reactant in the reactant mixture should be at least about 1% to about 40% by volume and the molar ratio of ammonia to hydrocarbon will be from about 0.8 to about 8.0, preferably 2.0 to 4.0. It will be understood that the greater the number of alkyl groups to be converted to nitrile groups, the higher will be the ammonia to hydrocarbon ratio.

As indicated above, the catalyst-reactant used in the process will be composed of an oxide of vanadium intermediate $V_2O_5$ and $V_2O_3$ and that the catalyst used during the ammoxidation will be free of $V_2O_5$. It has been found that neither $V_2O_5$ nor $V_2O_3$ are effective in producing a suitable process. For example, use of $V_2O_5$ effects ammoxidation, but permits degradation of organic reactants and product to a large amount of carbon oxides. On the other hand, $V_2O_3$ is found to be essentially inert to the reaction and its presence contributes to lower activity and reduced process efficiency. Thus, the invention requires the use as catalyst those vanadium oxides intermediate $V_2O_5$ and $V_2O_3$ and because $V_2O_5$ cause carbon oxides formation, it must be kept out of the catalyst composition to the greatest extent possible. The term "catalyst-reactant" is used throughout this disclosure because vanadium oxides act as a reactant in supplying oxygen for the oxidation of the alkyl group of the organic reactant to a nitrile function. As the reaction proceeds the catalyst-reactant is reduced to $V_2O_3$ which, as indicated above, is inert to effect ammoxidation. For this reason, build up of $V_2O_3$ must be avoided and before significant amounts of $V_2O_3$ are present (about 35% to 65% by weight of the catalyst) the catalyst is removed from the ammoxidation process and is regenerated. This regeneration is accomplished by oxidation of the catalyst mass to $V_2O_5$ with air or other oxygen source and the $V_2O_5$ subsequently reduced to the useful intermediate oxide which is recycled to the process.

The vanadium oxides used as catalysts in the process of the invention will, as indicated above, be intermediate $V_2O_5$ and $V_2O_3$. X-ray diffraction studies have shown that vanadium oxides operable in the process may be expressed empirically as $V_6O_{11}$, $V_7O_{13}$, $V_8O_{15}$, $V_2O_4$ and $V_6O_{13}$. The average valence of the vanadium ion in these oxides ranges from 3.66 to 4.33. Preferably, $V_2O_4$ and $V_6O_{13}$ will be used as the operable catalyst and the most preferred will be $V_2O_4$.

It will also be understood that the catalyst may be promoted with or be admixed with a wide variety of other known catalysts for ammoxidation; e.g., oxides of molybdenum, tungsten, zirconium, titanium, tin, phosphorus, etc. and other materials such as uranyl molybdate and iron, lead, and copper molybdates may also be used in conjunction with $V_2O_4$. Zirconium, titanium, and tin oxides are particularly preferred agents which may be mixed with the vanadium catalyst. Since the intermediate vanadium oxide catalyst is a reagent, it is obvious economically that this oxide should comprise a large portion of the catalytic material (at least about 50% by weight), but it will be understood that the process is operable with smaller amounts of the intermediate vanadium oxide.

The catalyst-reactant is readily prepared by reduction of $V_2O_5$. For this purpose a reducing agent must be used which will not effect reduction below the desired intermediate oxides. Ammonia and $SO_2$ are suitable reducing agents, but hydrogen and CO should be avoided since they tend to reduce $V_2O_5$ down to inactive $V_2O_3$. The intermediate vanadium oxides will consist essentially of $V_2O_4$, $V_6O_{13}$, and $V_6O_{11}$ as evidenced by X-ray diffraction patterns of the catalyst-reactant. In the preferred technique for making the catalyst-reactant, $V_2O_5$ supported on alumina, silica, silica-alumina, magnesia, boria, or other conventional support is treated with ammonia vapor at a temperature of about 400° to about 500° C. until reduction of all the $V_2O_5$ is complete. This is readily determined by analysis of the exiting gases to determine the presence of nitrogen, no nitrogen ($N_2$) being formed when the reaction is completed. Alternatively, the completion of the reaction may be determined by X-ray diffraction to establish that the characteristic X-ray diffraction pattern of $V_2O_5$ is absent. This preparative technique and the characteristic X-ray pattern is disclosed in the article by Tarrama et al, Kogyo Kaguku Zasski, vol. 55, No. 2, pp. 68–71, 1952, Laboratory of Fuel Chemistry, Department of Engineering, Kyoto University, Kyoto, Japan.

It will be understood, of course, that the intermediate oxides may be made (and regenerated) in the ammoxidation reactor.

As indicated above, the ammoxidation reaction produces $V_2O_3$ during the process which must be removed. Thus, it is necessary to carry out the process so as to minimize formation of the inactive $V_2O_3$ and thus frequent regeneration is required. The need for regeneration is easily determined by X-ray diffraction analysis of a catalyst sample to determine the amount of $V_2O_3$ present. When about 35% to about 65% by weight of the $V_2O_3$ is in the catalyst regeneration should be carried out. Preferably, regeneration will be carried out when the $V_2O_3$ content of the catalyst reaches about 50% by weight. The regeneration step is readily accomplished by partial oxidation to the useful intermediate oxides or, preferably, by oxidation to $V_2O_5$ with subsequent reduction by $NH_3$ as described above. In any event, regeneration techniques are well known in the art and may be accomplished by using fixed bed-swing reactors, a moving bed with regeneration of the catalyst after it passes out of the reactor, and the like.

The total amount of catalyst reactant on the support is not critical and will vary from about 0.5 to about 98 weight percent. Preferably, however, the amount on the support will be about 20 to about 80% by weight.

The organic reactants useful in the process may be selected from a wide variety of compounds and will include alkyl-substituted aromatic, aliphatic, alicyclic, and heterocyclic compounds. Among preferred starting materials are the mono- and polyalkyl-substituted aromatic hydrocarbons such as toluene, the xylenes, mesitylene, pseudocumene, durene, pentamethylbenzene, 2 - methylnaphthalene, polymethylnaphthalenes, such as 2,6-, 2,7-, 1,5-, 1,8- and 2,3-dimethylnaphthalene, monoalkyl and polyalkylanthracenes, and the like. The alkyl substituent may, of course, contain more than a single carbon atom and thus the corresponding ethyl and other lower alkyl substituents are also useful.

Aliphatic compounds normally subjected to ammoxidation include the olefinic compounds. Thus, any olefinic hydrocarbon having at least one alkyl group is useful in the process. Examples of such compounds are propylene, butenes, octenes, methyl heptenes, alkylbutadienes, pentadienes, ethylbutenes, hexadienes, heptadienes, and the like, all of which will give the corresponding nitriles. Preferred olefins are those containing up to about ten carbon atoms, particularly propylene, butenes, and the methylbutadienes, and cycloolefinic compounds, particularly the alkyl-substituted hydrocarbon olefins exemplified by 3-methyl cyclohexene, 3,6-dimethyl cyclohexene, methyl tetralin, and the like.

Also of value as reactants are alicyclic compounds having an alkyl substituent and these compounds are exemplified by methylcyclopentane, methylcyclohexane, the alkyl-substituted tetralins, decalins, and the like.

The heterocyclic compounds useful as organic reactants in the process will include alkyl-substituted furans, pyrroles, indoles, thiophenes, pyrazoles, imidazoles, thiazoles, oxazoles, pyrans, pyridines, quinolines, isoquinolines, pyrimidines, pyridazines, pyrazines, and the like, all of which are converted to the corresponding nitriles. Preferred reactants in this group are the mono-, di- and tri-alkyl pyridines.

In order to more fully describe and illustrate the invention, the following examples are given. In these examples, the intermediate vanadium oxide catalyst-reactants used in the invention is characterized by the term "$V_2O_4$."

EXAMPLE 1

Ammoxidation reactions are carried out in a tubular reactor containing the catalyst-reactant with m-xylene using each of $V_2O_5$, $V_2O_4$, and $V_2O_3$ as catalysts. Table I lists the reaction conditions and the results which are obtained.

TABLE I

Ammoxidation of m-Xylene

Temperature—450° C.
Contact time—11–12 seconds
Mole ratio of $NH_3$ to hydrocarbons—12:1

| | Catalyst | | |
|---|---|---|---|
| | $V_2O_5$ [a] | $V_2O_4$ [b] | $V_2O_3$ [c] |
| Product obtained, percent: | | | |
| m-Xylene unreacted | 3.2 | 54.0 | 94.7 |
| m-Toluonitrile | 5.3 | 15.3 | 4.6 |
| Isophthalonitrile | 53.5 | 17.2 | 1.1 |
| Benzonitrile | 2.6 | 8.0 | 0.4 |
| Carbon oxides | 35.8 | 5.8 | 0.2 |
| Conversion | 97.0 | 46.0 | 5.3 |

[a] 74% $V_2O_5$ on silica gel.
[b] 80% $V_2O_4$ on $Al_2O_3$.
[c] 50% $V_2O_3$ on silica gel.

It can be seen from the above table that $V_2O_5$ as catalyst gives a higher conversion than is obtained with $V_2O_4$, nevertheless, a large amount of hydrocarbon reactant is burned to carbon oxides. With $V_2O_4$ as catalyst, however, carbon oxide formation is vastly reduced and the unreacted hydrocarbon is still available for reaction by recycling. Thus the process is a significant improvement over the $V_2O_5$ catalyst. With $V_2O_3$ it is seen that conversion to nitriles is so low as to be impracticable.

EXAMPLE 2 m-Toluonitrile is subjected to ammoxidation with the same catalysts and under the same conditions as in Example 1. The results obtained are shown in Table II:

TABLE II

Ammoxidation of m-Toluonitrile

| | Catalyst | | |
|---|---|---|---|
| | $V_2O_5$ | $V_2O_4$ | $V_2O_3$ |
| Product obtained, percent: | | | |
| Unconverted | 4.8 | 54.0 | 96.8 |
| Isophthalonitrile | 56.0 | 35.6 | 2.4 |
| Benzonitrile | 0.8 | 10.0 | 0.6 |
| Carbon oxides | 38.1 | 1.4 | 0.2 |

It is obvious from Table II that the $V_2O_4$ catalyst significantly reduces formation of carbon oxides and as in Example 1, $V_2O_3$ is essentially inactive for the ammoxidation reaction.

EXAMPLE 3 p-Xylene is subjected to ammoxidation at 450° C., at an ammonia to hydrocarbon ratio of 3:1, a contact time of 2.7 seconds, over a $V_2O_5$ and $V_2O_4$ catalyst. The results obtained are shown in Table III:

TABLE III

| Product obtained, percent: | Catalyst | |
| --- | --- | --- |
|  | $V_2O_5$ | $V_2O_4$ |
| Terephthalonitrile | 36.1 | 10.5 |
| Toluonitrile | 25.7 | 80.0 |
| Benzonitrile | 4.8 | 2.4 |
| Carbon oxides | 33.4 | 7.0 |

EXAMPLE 4

An ammoxidation of m-xylene is carried out at 450° C., a mole ratio of ammonia to hydrocarbon of 3:1 and a contact time of 2 seconds over a catalyst consisting of unsupported zirconium oxide (40.7%) and vanadium oxide (59.3%). Table IV shows the results obtained:

TABLE IV

| Product obtained, percent: | Catalyst | |
| --- | --- | --- |
|  | $V_2O_5/ZrO_2$ | $V_2O_4/ZrO_2$ |
| Conversion | 45.0 | 21.2 |
| Isophthalonitrile | 24.9 | 84.6 |
| m-Toluonitrile | 27.6 | 1.7 |
| Benzonitrile | 2.5 | 0.1 |
| Carbon oxides | 45.0 | 13.6 |

A catalyst of 40% stannic oxide and 60% $V_2O_4$ or $V_2O_5$ under conditions of the above example gives similar results.

EXAMPLE 5

Following the details of the above examples, p-xylene is ammoxidized with various catalyst-reactants at 450° C. The data is shown in the following table:

| Catalyst-reactant | Contact time (sec.) | $NH_3$ to hydrocarbon ratio | Conversions | Carbon oxides | BN | TN | DN |
| --- | --- | --- | --- | --- | --- | --- | --- |
| $V_2O_4$ a | 4 | 3:1 | 27.4 | 15.6 | 0.3 | 66.2 | 17.9 |
| $V_2O_5$ a | 4 | 3:1 | 27.5 | 52.4 | 1.9 | 42.2 | 1.5 |
| $V_2O_4$ a | 8 | 3:1 | 39.2 | 20.8 | 0.9 | 51.5 | 26.8 |
| $V_2O_5$ a | 8 | 3:1 | 27.7 | 45.1 | 1.3 | 46.5 | 7.1 |
| $V_2O_4$ b | 8 | 8:1 | 70.1 | 16.7 | 0.3 | 56.3 | 26.7 |
| $V_2O_5$ b | 8 | 8:1 | 98.3 | 51.9 | 1.1 | 7.1 | 39.9 |
| $V_2O_4$ c | 8.5 | 3:1 | 38.1 | 12.0 | 0.6 | 60.7 | 26.8 |
| $V_2O_5$ c | 8.5 | 5:1 | 73.8 | 44.9 | 0.9 | 15.9 | 38.3 |
| $V_2O_4$ d | 8.5 | 3:1 | 66.2 | 11.4 | 0.6 | 50.0 | 38.0 |
| $V_2O_5$ d | 7.6 | 9.5:1 | 88.3 | 31.6 | 0.2 | 14.5 | 53.7 | a 50% by weight on a silica gel support (23%) and promoted with CaO (27%).
b 50% by weight on alumina (42.5%) and promoted with $B_2O_3$ (7.5%).
c 39% by weight on silica gel (61%) with $TiO_2$ (50%).
d With $TiO_2$ (50%).

NOTE.—BN=benzonitrile: TN=toluonitrile; DN=dinitrile (terephthalonitrile).

As can be seen from the above data the intermediate vanadium oxides always result in significantly lower carbon oxides formation. Of particular interest in this regard is the comparison of the last set of data in the above table where the catalyst-reactant is admixed with $TiO_2$. Even under conditions which would tend to favor reduced conversion to carbon oxides (e.g., lower temperature, shorter contact time, and higher $NH_3$ to hydrocarbon ratio), the $V_2O_5$ system produced about three times the amount of undesired carbon oxides than did the process of the invention.

EXAMPLE 6

The procedure of Example 1 is carried out until examination of the $V_2O_5$ catalyst by X-ray shows that about 50% by weight of $V_2O_3$ is present and then the catalyst-reactant is subjected to regeneration. Air at 400–450° C. is passed through the tubular reactor containing the catalyst-reactant in order to oxidize it to essentially all $V_2O_5$, the air flow being stopped when no further exotherm occurs in the catalyst-reactant bed. Then, ammonia is passed over the $V_2O_5$ until neither water nor nitrogen is detectable in the reactor effluent stream, at which point X-ray analysis shows no $V_2O_5$ to be present and that the vanadium oxide present is essentially all $V_2O_4$. The tubular reactor is again connected to a supply of hydrocarbon and ammonia and the ammoxidation repeated as before. This cyclic procedure is carried out numerable times to produce a nitrile mixture of isophthalonitriles, m-toluonitrile, and benzonitrile in about 50% conversion and containing less than 10% of carbon oxides.

EXAMPLE 7

A catalyst of 20% $V_2O_5$, 6% $MoO_3$, 0.5% $P_2O_5$ on alumina is placed in a tubular reactor as in Example 1 and m-xylene and ammonia at a mole ratio of 3.2:1 is passed into the reactor at 450° C. for a contact time of 4.9 seconds. The product obtained consists of 86.5 mole percent of nitriles (46.1% toluonitrile, 40.4% isophthalonitrile, and 2.1% benzonitrile) and carbon oxide formation is 11.3%.

When the experiment is repeated except that ammonia is first passed over the catalyst to reduce the $V_2O_5$ to $V_2O_4$, the total nitrile yield is increased to 94.3% (3.9% benzonitrile, 73% toluonitrile and 21.3% isophthalonitrile) and the carbon oxide formation is only 1.8%.

When X-ray diffraction of the catalyst shows about 50% by weight of the used catalyst is $V_2O_3$ the catalyst is regenerated as in Example 6 and ammoxidation continued on this cyclic basis to repeatedly give the high yields of nitriles and low carbon oxide formation.

The invention claimed is:

1. In the vapor phase process of ammoxidation to form nitriles by reaction of ammonia and an organic reactant selected from the group of alkyl-substituted aromatic, aliphatic, and alicyclic hydrocarbon compounds and alkyl-substituted heterocyclic compounds and in the absence of added oxygen, the improvement of reducing the formation of carbon oxides during reaction which comprises using as catalyst a composition which is essentially free of $V_2O_5$ and comprised of a vanadium oxide which is intermediate $V_2O_5$ and $V_2O_3$, said catalyst being removed from said process and regenerated to the intermediate oxide prior to its in-situ conversion to significant amounts of $V_2O_3$.

2. In the vapor phase ammoxidation to form nitriles by reaction of ammonia and an organic compound selected from the group of alkyl-substituted aromatic, aliphatic, and alicyclic hydrocarbon compounds and alkyl-substituted heterocyclic compounds in the absence of added oxygen, the improvement which comprises using as catalyst a composition which is essentially free of $V_2O_5$ and is comprised of a vanadium oxide intermediate $V_2O_5$ and $V_2O_3$ where the average valence of the vanadium ion is between 3.66 and 4.33, removing said catalyst from said process prior to its in-situ conversion to a significant amount of $V_2O_3$ and regenerating said catalyst by oxidation to $V_2O_5$ and subsequently reducing it with ammonia to said intermediate oxide for reuse in said process.

3. The process of Claim 2 where the catalyst is $V_2O_4$.

4. The process of Claim 3 where the hydrocarbon is an alkyl-substituted aromatic hydrocarbon.

5. The process of Claim 3 where p-xylene is converted to toluonitrile and terephthalonitrile.

6. The process of Claim 3 where m-xylene is converted to isophthalonitrile.

7. The process of Claim 3 where the hydrocarbon is a dimethylnaphthalene.

8. The process of Claim 2 where the catalyst is $V_6O_{13}$.

9. The process of Claim 2 where the catalyst is mixed with a second ammoxidation catalyst selected from the group consisting of oxides of molybdenum, tungsten, zirconium, titanium, tin and phosphorus, and molybdates of uranium, iron, lead and copper.

10. The process of Claim 9 where the catalyst is mixed with $ZrO_2$.

11. The process of Claim 9 where the catalyst is mixed with $TiO_2$.

12. The process of Claim 9 where the catalyst is mixed with stannic oxide.

13. The process of Claim 9 where the catalyst is mixed with $MoO_3$ and $P_2O_5$.

14. In the vapor phase ammoxidation of a lower alkyl-substituted benzene or naphthalene hydrocarbon to form nitriles by reaction with ammonia in the absence of added oxygen, said ammoxidation being carried out at a temperature of from about 350° C. to about 475° C., the improvement which comprises using as catalyst a composition which is essentially free of $V_2O_5$ and is comprised of a vanadium oxide intermediate $V_2O_5$ and $V_2O_3$, said catalyst being on a support in an amount of from about 20% to about 80% by weight, and said catalyst being removed from said process and regenerated to the intermediate oxide prior to its in-situ conversion to significant amounts of $V_2O_3$.

References Cited

UNITED STATES PATENTS 2,450,639   10/1948   Denton _____ 260—465

LEWIS GOTTS, Primary Examiner

D. H. TORRENCE, Assistant Examiner

U.S. Cl. X.R.

252—437, 461, 467, 472; 260—251 R, 283 CN, 294.9, 302 R, 307 R, 309, 310 R, 326.62, 329, 345.1, 346.1 R, 464, 465.3